(12) United States Patent  (10) Patent No.: US 8,151,097 B2
Sunayama                   (45) Date of Patent:     Apr. 3, 2012

(54) MULTI-THREADED SYSTEM WITH BRANCH

(75) Inventor: Ryuichi Sunayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/631,143

(22) Filed: Dec. 4, 2009

(65) Prior Publication Data

US 2010/0082952 A1    Apr. 1, 2010

Related U.S. Application Data

(63) Continuation of application No. PCT/JP2007/000646, filed on Jun. 19, 2007.

(51) Int. Cl.
G06F 9/32 (2006.01)
G06F 9/40 (2006.01)
G06F 9/52 (2006.01)

(52) U.S. Cl. ............ 712/240; 712/234; 712/217

(58) Field of Classification Search ............ 712/234, 712/240, 217
See application file for complete search history.

(56) References Cited

U.S. PATENT DOCUMENTS

| | | | |
|---|---|---|---|
| 6,233,599 B1 | 5/2001 | Nation et al. | |
| 6,681,345 B1 | 1/2004 | Storino et al. | |
| 6,748,556 B1 | 6/2004 | Storino et al. | |
| 2001/0037447 A1* | 11/2001 | Mukherjee et al. | 712/239 |
| 2003/0005263 A1* | 1/2003 | Eickemeyer et al. | 712/218 |
| 2003/0126416 A1 | 7/2003 | Marr et al. | |
| 2004/0003214 A1 | 1/2004 | Sunayama et al. | |
| 2004/0215720 A1* | 10/2004 | Alexander et al. | 709/204 |
| 2005/0240752 A1* | 10/2005 | Yokoi et al. | 712/1 |
| 2006/0168571 A1* | 7/2006 | Ghiasi et al. | 717/127 |
| 2006/0218557 A1* | 9/2006 | Garthwaite et al. | 718/105 |
| 2007/0180438 A1* | 8/2007 | Suba | 717/151 |

FOREIGN PATENT DOCUMENTS

| | | |
|---|---|---|
| EP | 1622005 A1 | 2/2006 |
| JP | 10-97461 | 4/1998 |
| JP | 2002-108630 | 4/2001 |
| JP | 01/41530 A2 | 6/2001 |
| JP | 2002-123402 | 4/2002 |
| JP | 2003-516570 | 5/2003 |
| JP | 2005-514698 | 5/2005 |
| JP | 3716415 | 9/2005 |
| JP | 2005-309762 | 11/2005 |
| WO | WO 01/48599 A1 | 7/2001 |
| WO | 2006-114874 A1 | 11/2006 |

OTHER PUBLICATIONS

International Search Report PCT/JP2007/000646, WO 2008/155794.*
Extended European Search Report dated Oct. 28, 2011 for corresponding European Application No. 07790172.6.

* cited by examiner

Primary Examiner — Daniel Pan
(74) Attorney, Agent, or Firm — Fujitsu Patent Center

(57) ABSTRACT

When two threads (strands), for example, are executed in parallel in a processor in a simultaneous multi-thread (SMT) system, entries of a branch reservation station of an instruction control device are separately used in a strand 0 group and a strand 1 group. The data of the strand 0 and the data of the strand 1 are allocated to the respective entries by switching a select circuit. When an entry is released from the branch reservation station, the select circuit switches the strands so that a branch instruction in one strand can be released in order, thereby releasing the entry.

12 Claims, 17 Drawing Sheets

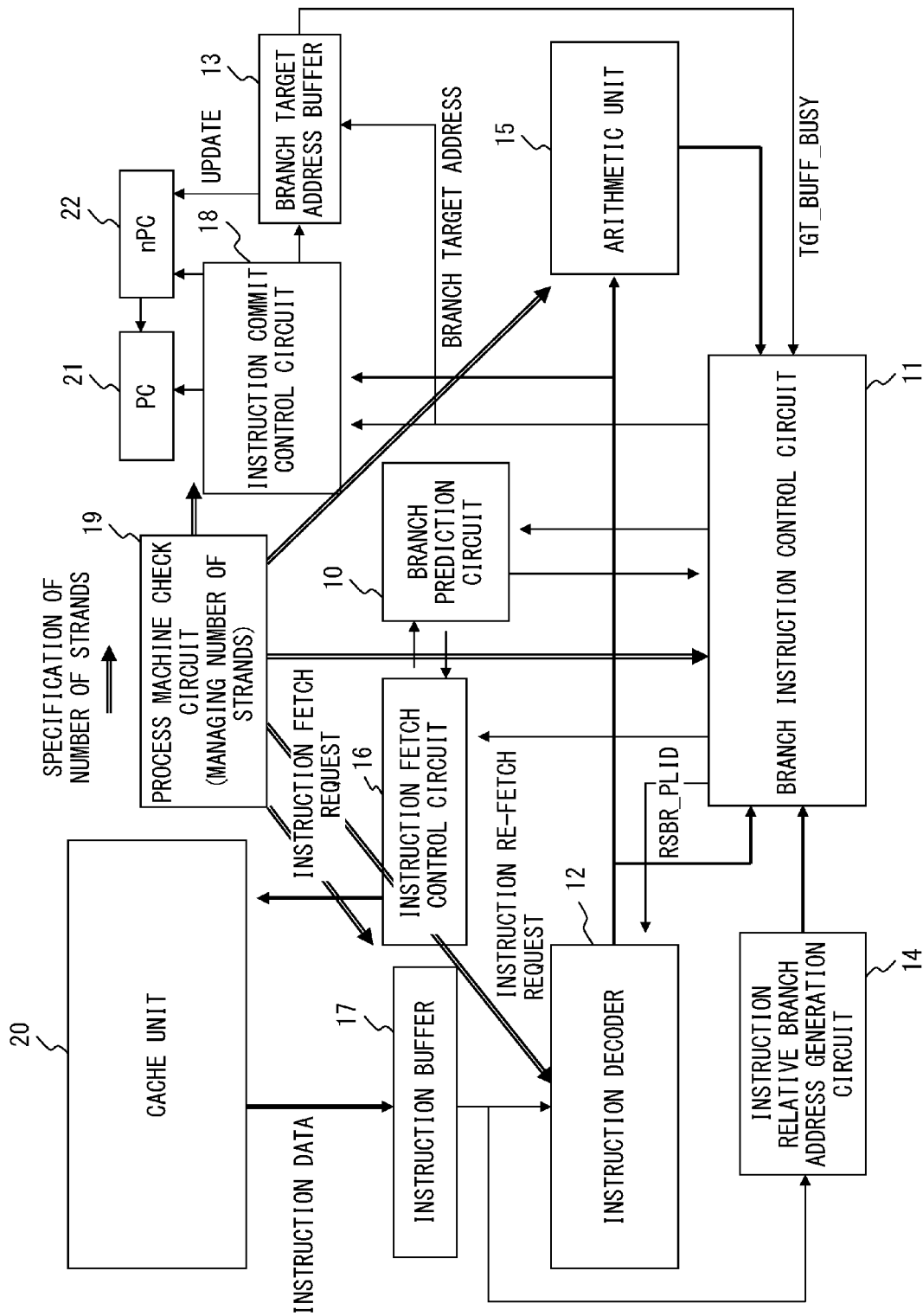
F I G. 1

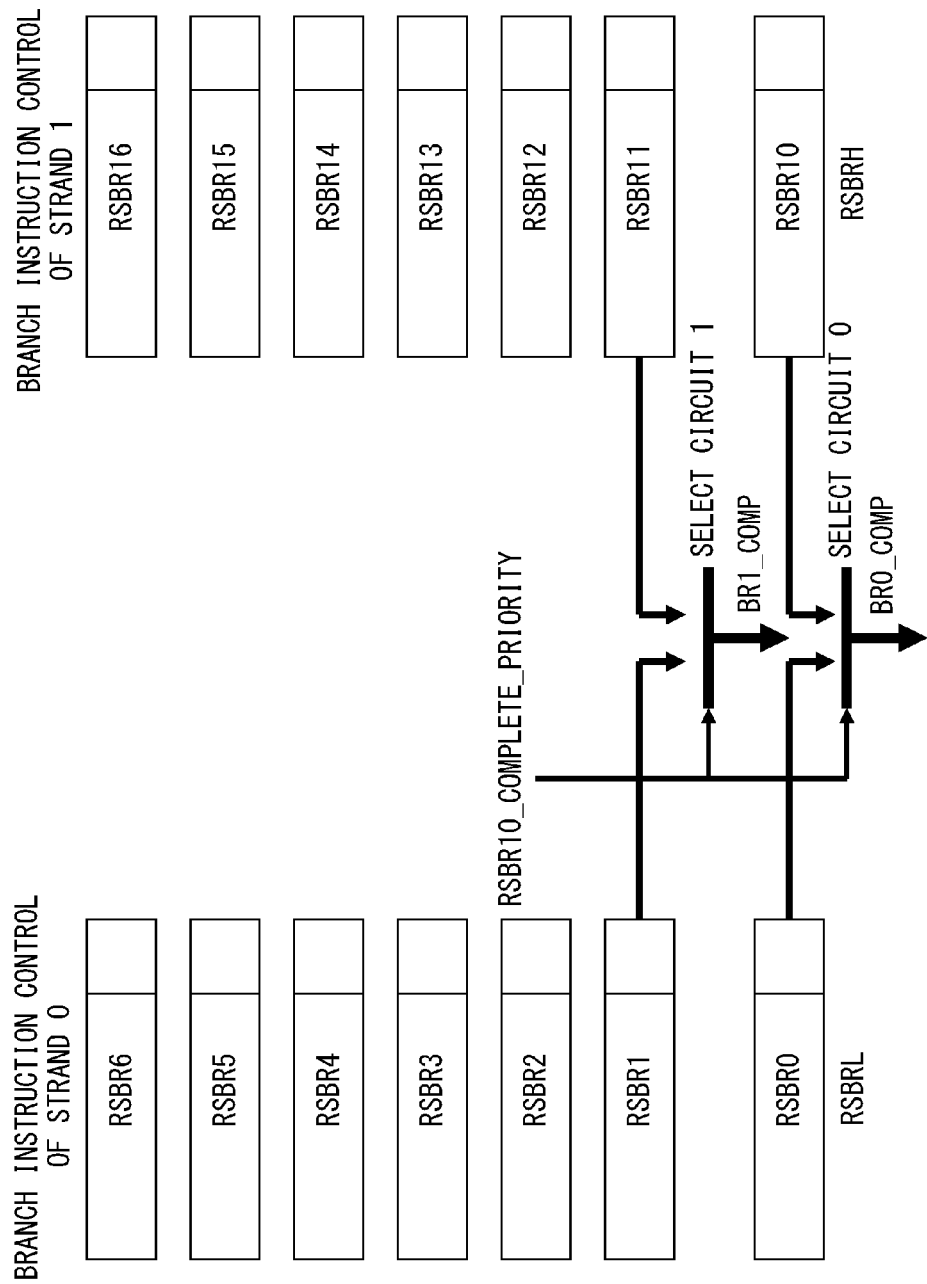
F I G. 4

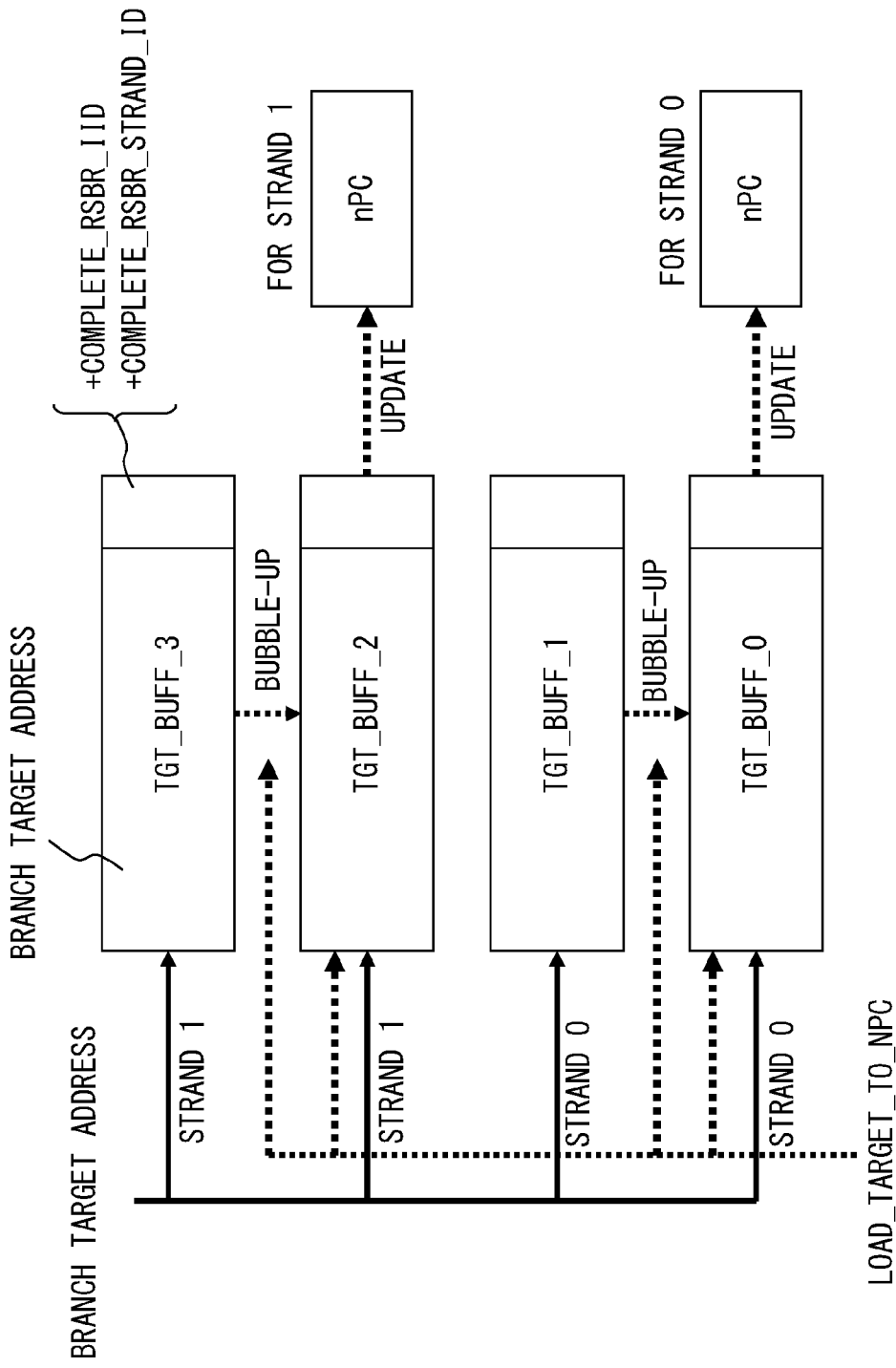
F I G. 8

MULTI-THREADED SYSTEM WITH BRANCH

CROSS-REFERENCE TO RELATED APPLICATION

This application is a continuation application of International PCT Application No. PCT/JP2007/000646, filed on Jun. 19, 2007, the entire contents of which are incorporated herein by reference.

FIELD

The present invention relates to a processor, and more specifically to a processor for performing instruction control in out-of-order processing and in a multi-thread processing system called an SMT (Simultaneous Multi-Thread system).

BACKGROUND

With great strides of IT technology, general purpose computers such as servers etc. have been recognized as a part of social infrastructures, and the market demand for improved performance and power saving operations of computers has been increased. The demand is similarly growing for the CPU (Central Processing Unit) of a computer.

Conventionally, the performance of the CPU has been attained by improving the instruction processing from an in-order execution system to an out-of-order execution system, improving an instruction processing circuit with the advances of semiconductor technology, and using high frequencies for higher operation speeds. However, with the advanced microfabrication technology for semiconductors, strict requirements have been imposed on the power consumption for operations and the growth of the ratio of the performance to the increasing number of transistors has been slowing. Therefore, it has become more difficult to solve the current problems by means of the conventional workarounds.

In this situation, there have been various apparatuses by, for example, applying a plurality of cores in a CPU, processing a plurality of instruction threads in a core, etc. There are systems such as a VMT (Vertical Multi-Thread system), an SMT (Simultaneous Multi-Thread system), etc. for processing a plurality of instruction threads in a core.

The VMT is advantageous in processing a plurality of instruction threads by adding a relatively small number of transistors, but cannot simultaneously process a plurality of threads, thereby incurring a penalty when thread switching occurs.

The SMT does not incur the thread switching unlike the VMT, but requires a larger number of transistors to be added, and when a circuit is used to share transistors between threads to reduce the number of transistors, there occurs an outstanding influence between the threads that the delay of processing in one thread affects the processing in another thread. Especially, the SMT requires a larger number of transistors and causes the problem that the increased transistors have to be more efficiently used.

The patent document 1 discloses the technology of a state machine in a multi-thread processor. The patent document 2 discloses the memory corresponding to a multi-thread system. The patent documents 3 and 4 disclose the technology of accessing an erroneous thread.

[Patent Document 1] National Publication of International Patent Application No. 2003-516570
[Patent Document 2] Japanese Laid-open Patent Publication No. 10-97461
[Patent Document 3] Japanese Laid-open Patent Publication No. 2002-108630
[Patent Document 4] Japanese Laid-open Patent Publication No. 2002-123402

SUMMARY

The first instruction control device according to the present invention is used in a processor in which a single thread can be executed or a plurality of threads can be simultaneously executed, and includes: a number-of-threads detection apparatus for detecting the number of threads being executed; and a delay instruction stack apparatus for grouping entries into the number of threads depending on the number of threads being executed, corresponding each entry group to each thread, performing processing a branch delay instruction stored in an entry in an out-of-order execution system independently for each thread, selecting an entry group so that a release of an entry is performed in an in-order execution system in each thread, and releasing an entry.

The second instruction control device according to the present invention is used in a processor in which a single thread can be executed or a plurality of threads can be simultaneously executed, and includes: a number-of-threads detection apparatus for detecting the number of threads being executed; and a delay instruction stack apparatus for grouping entries into the number of threads depending on the number of threads being executed, corresponding each entry group to each thread, performing processing a branch instruction stored in an entry in an out-of-order execution system independently for each thread, selecting an entry group so that a release of an entry is performed in an in-order execution system in each thread, and releasing an entry.

The third instruction control device according to the present invention is used in a processor in which a single thread can be executed or a plurality of threads can be simultaneously executed, and includes: a number-of-threads detection apparatus for detecting the number of threads being executed; and a branch target address buffer apparatus for grouping entries into the number of threads depending on the number of threads being executed, corresponding each entry group to each thread, storing a branch target address independently for each thread, selecting an entry group, and releasing an entry.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 is a block diagram of the entire instruction control device according to an embodiment of the present invention;

FIG. 4 is an explanatory view (2) of the operation of the branch reservation station according to an embodiment of the present invention;

FIG. 8 is an explanatory view (1) of the operation of a branch target address buffer;

DESCRIPTION OF EMBODIMENTS

Figure 2:
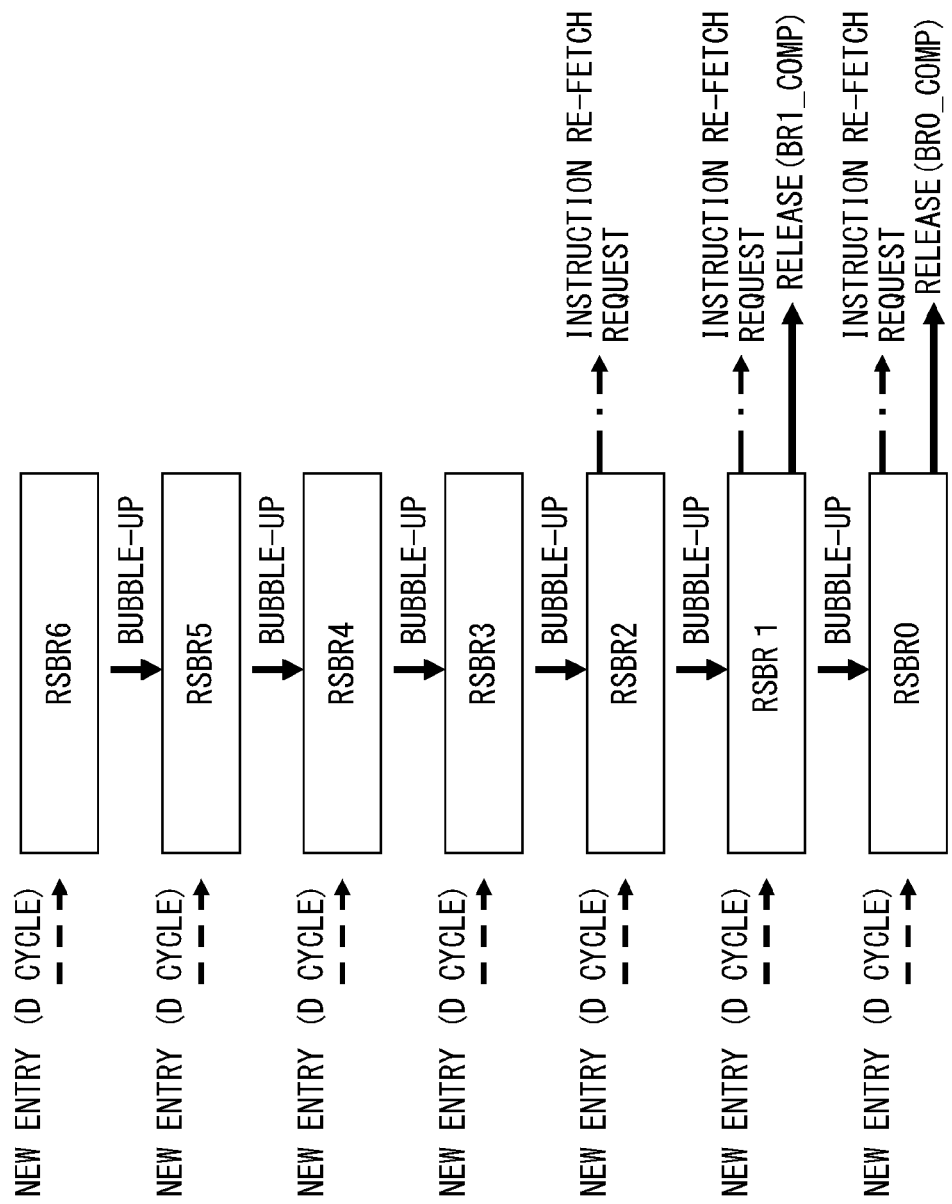
FIG. 2 is an explanatory view of the operation of a common branch reservation station.

Assumed in an embodiment of the present invention is a processor having a branch reservation station for controlling a branch instruction and capable of both executing a single thread and simultaneously executing a plurality of threads. In a branch reservation station, a branch instruction input to an execution pipeline is controlled, and a plurality of branch instructions is simultaneously controlled. One entry of the branch reservation station is used to control a branch instruction. The number of simultaneously controlled branch instructions depends on the number of entries of the branch reservation station.

In an embodiment of the present invention, all entries are allocated for branch control in executing a single thread, and all entries are allocated to each thread in executing a plurality of threads. In the branch reservation station, all entries can be allocated in processing a single thread or a plurality of threads, and all implemented resources can be used without waste. In addition, during the execution of a plurality of threads, a branch instruction of each thread is independently controlled, and the performance of a control circuit for arbitration among strands is not affected. Aside from the multi-thread processing, the number of entries to be used in the branch reservation station can be restricted by generating an event. The control circuit is commonly used as the control circuit in a multi-thread system.

In the information processing apparatus according to the present embodiment, it is assumed that an SPARC-V9 architecture is used, and an instruction control device is operated in the Simultaneous Multi-Thread system called an SMT in the out-of-order executing. In the description below, the maximum number of threads during the execution in the multi-thread system is two, but a similar circuit can be used in the case of three or more threads. Any number of entries other than the number described in the following embodiments can be accepted.

FIG. 1 is a block diagram of the entire instruction control device according to an embodiment of the present invention.

The instruction control device has a branch prediction circuit (branch history (BRHIS)) 10 as a branch prediction mechanism, and a branch instruction control circuit (branch control (BRCTL)) 11 as a circuit for controlling a branch instruction. The branch instruction control circuit 11 has a branch reservation station (reservation station for branch (RSBR)) for control of a branch instruction, and a delay instruction stack (delay slot stack (DSS)) for control of a branch delay instruction (an instruction in the delay slot or a delay instruction). The branch instruction control circuit 11 performs processes such as determining a branch, managing a branch target address, determining whether or not a branch prediction can be made, requesting to re-fetch an instruction, re-inputting a branch delay instruction to an instruction decoder 12 when the branch prediction fails, etc. The management of a branch target address is classified into the control in the branch instruction control circuit 11 and the control until the completion of a branch instruction after the control of the branch instruction control circuit 11. It also includes a branch target address buffer 13 for the latter control.

The branch target address buffer 13 includes a plurality of entries, and the branch target address is managed when an instruction whose branch determination has been completed is branched. In addition, the instruction control device is further provided with an instruction relative branch address generation circuit 14 for calculating the branch target address, an arithmetic unit 15, an instruction fetch control circuit 16, an instruction buffer 17, an instruction decoder 12, an instruction commit control circuit 18, a process machine check circuit 19, and a cache unit 20.

After an instruction fetch instruction from the instruction fetch control circuit 16 is provided for the cache unit 20, and the fetched instruction is stored in the instruction buffer 17, the instruction decoder 12 decodes the fetched instruction. The instruction relative branch address generation circuit 14 generates a branch target address of a relative branch instruction. When the instruction decoded by the instruction decoder 12 is a branch instruction, the branch instruction is registered and executed in the branch instruction control circuit 11.

The arithmetic unit 15 calculates the branch target address of the branch instruction. The branch prediction circuit 10 predicts the branch target of a branch instruction in the branch instruction control circuit 11, and provides a predicted branch target address for the instruction fetch control circuit 16 to prefetch the instruction at the branch target address.

The instruction commit control circuit 18 manages an instruction to be completely executed in the decoded instructions. The branch target address buffer 13 manages the branch target address of a determined branch instruction. A program counter 21 and a next program counter 22 counts the address of an instruction being executed and the address of the next instruction. The counting trigger of the counters is provided by the instruction commit control circuit 18. The process machine check circuit 19 manages the number of strands executed in parallel in the instruction buffer 17, the instruction decoder 12, the branch instruction control circuit 11, the arithmetic unit 15, and the instruction commit control circuit 18, and submits the current number of strands to them. When the entries of the branch target address buffer 13 are filled, TGT_BUFF_BUSY is input to the branch instruction control circuit 11. RSBR_PLID notifies the branch instruction control circuit 11 of the ID of an instruction statement to be processed next. The branch target address buffer 13 updates the next program counter 22 when control is passed to the branch target address.

FIG. 2 is an explanatory view of the operation of a common branch reservation station.

FIG. 2 illustrates seven branch reservation stations (RSBR). New instructions are sequentially set from an RSBR 0 to an RSBR 6. That is, the oldest instruction is set in the RSBR 0. A new entry is set in the RSBR in the instruction decoding cycle. A new entry can be generated with the maximum of two instructions. The entry in the RSBR is controlled in the in-order execution system to determine a branch, determine whether or not a branch prediction can be performed, and request re-fetch of an instruction. An entry is released after the completion of control in the in-order execution system at the maximum of two instructions from the oldest instruction. The maximum of three instructions can be re-fetched from the oldest instruction. In FIG. 2, entries are managed in the bubble-up system and the entries are bubbled up by the number of released entries. The order of the bubble-up is RSBR 6→RSBR 5→RSBR 4→RSBR 3→RSBR 2→RSBR 1→RSBR 0. Therefore, when there is an entry in and after RSBR 2, the VALID of the RSBR 0 and RSBR 1 can be left as is. The entry data is rewritten in the bubble-up process. The new entry is stored by an instruction in the entry of the reservation station in the code cycle (D cycle). An instruction re-fetch request is issued to the reservation station when a branch prediction fails, and an entry is released by the instruction commit control circuit 18 when an instruction completing process is terminated.

1) Relating to Input of Instruction to Branch Instruction Control Circuit and Generation of Entry in Branch Instruction Control Circuit When instruction data is supplied from the instruction buffer 17 to the instruction decoder (hereinafter referred to simply as a decoder) 12, the decoder 12 decodes an instruction, and determines the type of the instruction supplied from the instruction buffer 17. Upon detection of a branch instruction in the instructions supplied from the instruction buffer 17, the decoder 12 allocates the control of the branch instruction to the branch instruction control circuit 11. The instructions input to the execution pipeline are controlled by the instruction commit control circuit 18 until the instructions are completed. The instruction commit control circuit 18 guarantees the order of the instructions and controls the update of the register. The decoder 12 can simultaneously decode the maximum of four instructions, but the maximum of two branch instructions are input by the restriction of the circuit in the branch instruction control circuit 11. The decoder 12 transmits to the branch instruction control circuit 11 such signals as +D_RSBR_USE, +D_IID[5:0], +D_STRAND_ID, +D_REL, etc. together with necessary data and tags. A set of these signals is transmitted to one branch instruction.

+D_RSBR_USE is a signal indicating that the instruction input to the execution pipeline used an RSBR. +D_IID is a signal indicating the order of the instructions input to the execution pipeline. Hereinafter, IID is referred to as an instruction ID. +D_STRAND_ID is a signal indicating the strand ID of the instruction input to the execution pipeline. +D_REL is a signal turning to 1 when an instruction is input to the execution pipeline.

FIGS. 3 through 6 are explanatory views of the operation of the branch reservation station according to an embodiment of the present invention.

Figure 3:
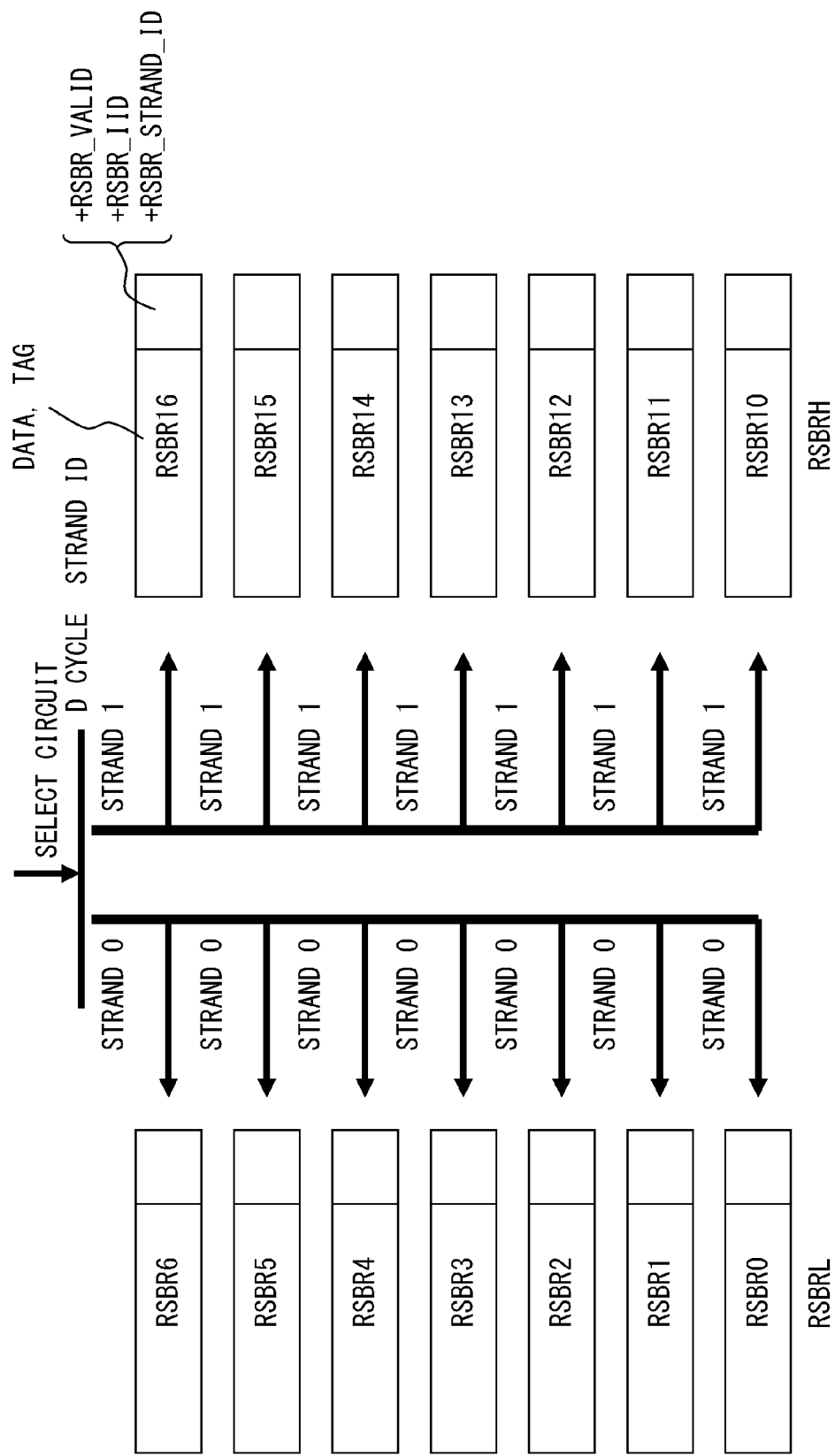
FIG. 3 is an explanatory view (1) of the operation of the branch reservation station according to an embodiment of the present invention.

In the example illustrated in FIG. 3, an RSBR is configured by a total of 14 entries. These entries are divided into two 7-entry groups. In this example, the first group is RSBRL (RSBR 0, RSBR 1, . . . , RSBR 6, strand 0) and the second group is RSBRH (RSBR 10, RSBR 11, . . . , RSBR 16, strand 1).

To determine the number of threads being executed in the execution pipeline, a status signal indicating a single thread system or a multi-thread system is transmitted from the process machine check circuit 19 to the reservation station. In this example, the number of threads is 2, and the threads are named strand 0 and strand 1. "0" and "1" are strand IDs. The distinction of the strands is made to easily been recognized in an instruction control device.

Described next is the multi-thread runtime. When an instruction is input from the decoder, the signal indicates +D_REL=1. If the instruction is a branch instruction, +D_RSBR_USE=1 is simultaneously indicated. If the input branch instruction is a strand 0, the entry is allocated to the RSBRL. If it is a strand 1, the entry is allocates to the RSBRH. Thus, a new entry is generated in an available entry. The allocation can be exchanged. However, the entries in the same group are to be the same strands.

The entry in each group is managed in the decoding order. For example, in the case of the RSBRL, the entries are generated in the order of RSBR 1, 2, 3, 4, 5, and 6 starting with the RSBR 0. When a new entry is generated, the signal indicating that the entry be currently valid (being used) is +RSBR_VALID=1. In the entry, signals +RSBR_IID[5:0] and +RSBR_STRAND_ID are registered with the data and tags necessary for control. +RSBR_VALID is a signal indicating that the RSBR entry is valid. +RSBR_IID is a signal indicating the instruction ID of a registered entry (branch instruction). +RSBR_STRAND_ID is a signal indicating the strand ID of a registered entry (branch instruction). These signals are held until the control in the branch instruction control circuit is terminated.

When there is no available entry in each group, the branch instruction control circuit transmits a signal +RSBR_PLID=1 to the decoder to stop inputting a new instruction of the strand to which the group belongs. If the signal is transmitted, the decoder temporarily stops the instruction decoding of the strand. When the RSBRL that manages the branch instruction of the strand 0 becomes full, +RSBR_PLID_STRAND_0=1 is indicated. When the RSBRH that manages the branch instruction of the strand 1 becomes full, +RSBR_PLID_STRAND_1=1 is indicated. The signals are transmitted to each strand, and when all strands indicate the signals of 1, the decoder temporarily stops.

When the branch instruction control terminates in the branch instruction control circuit, the terminated entry is released and an available entry is reserved, thereby indicating +RSBR_PLID=0 and resuming the decoding process. +RSBR_PLID is a signal indicating that there is no available entry in the branch instruction control circuit. +RSBR_PLID_STRAND_0 is a signal indicating that the RSBR of the strand 0 is full. +RSBR_PLID_STRAND_1 is a signal indicating that the RSBR of the strand 1 is full.

Figure 5:
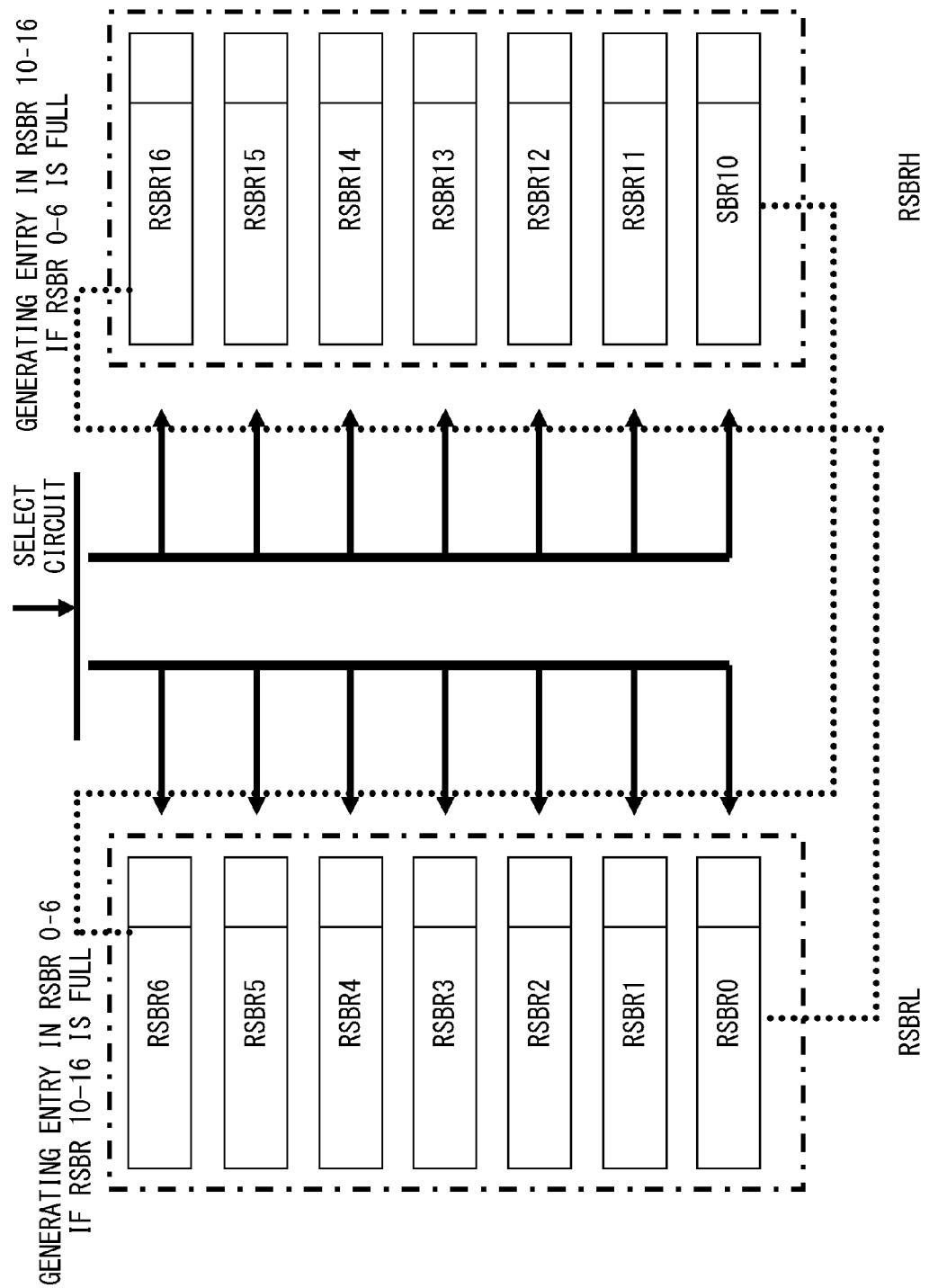
FIG. 5 is an explanatory view (3) of the operation of the branch reservation station according to an embodiment of the present invention.

The single thread runtime is described below with reference to FIG. 5. First, assume that both the RSBRL and the RSBRH have no entries. When the decoder inputs a branch instruction, a new entry is allocated to the RSBRL (or the RSBRH). Entries are generated for the RSBRs 0, 1, 2, 3, 4, 5, and 6. When the RSBRL becomes full, a new entry is allocated to the RSBRH. In this case, although an entry is generated by spanning the groups RSBRL and RSBRH, the decoder does not stop.

When entries are generated for the RSBR 10, 11, 12, 13, 14, 15, and 16 in the RSBRH, and the RSBRH becomes full, +RSBR_PLID=1 is transmitted to the decoder. The transmitted signal is issued to each strand as in the multi-strand system. When the strand 0 is executed in the single thread system, +RSBR_PLID_STRAND_0=1 is indicated (the inverted signal can be indicated). +RSBR_PLID=1 continues until there is no entry in the RSBRL. When there is no entry in the RSBRL, +RSBR_PLID=0 is indicated, the decoding process is resumed, and entries are generated for the RSBRs 0, 1, 2, 3, 4, 5, and 6. In the single thread system, the process is repeated, and entries are generated in the order of RSBRL→RSBRH→RSBRL→RSBRH. The registered entry data is the same in the multi-thread system and the single thread system.

The branch instruction control circuit also holds the DSS (delay instruction stack (delay slot stack)) for controlling a branch delay instruction in addition to the RSBR for controlling a branch instruction.

Figure 7:
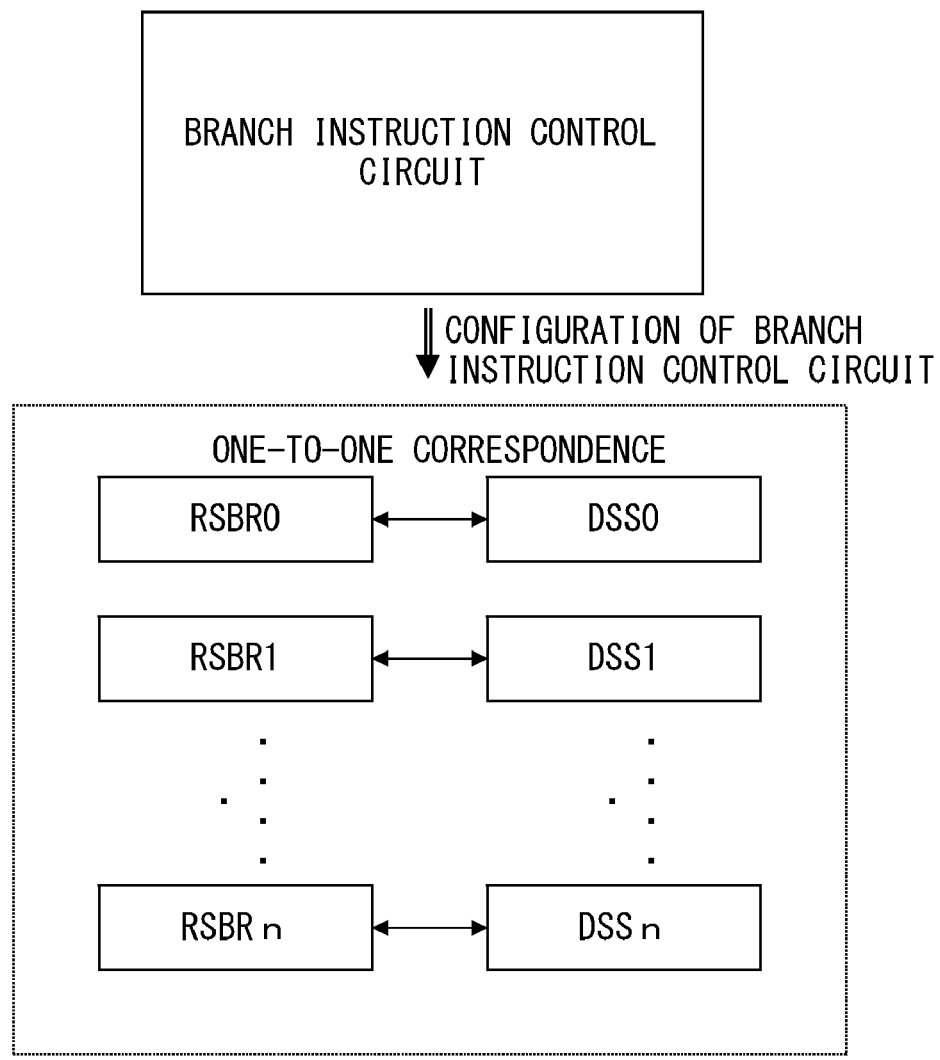
FIG. 7 is an explanatory view of a delay instruction stack.

FIG. 7 is an explanatory view of a delay instruction stack.

The DSS (delay slot stack) is configured by the same number of entries as the RSBR. That is, in the present embodiment, it is configured by a total of 14 entries. Thus, the reservation station RSBR and the DSS corresponds one to one. The entries of the DSS are divided into two 7-entry groups. The first group is a DSSL (DSS 0, DSS 1, . . . , DSS 6) and the second group is a DSSH (DSS 10, DSS 11, . . . , DSS 16). The decoder transmits to the branch instruction control circuit signals +D_DELAY_SLOT, +D_STRAND_ID, and +D_REL together with necessary data and tags for control. A set of these signals is transmitted to one branch delay instruction. +D_DELAY_SLOT indicates that the instruction input to the execution pipeline is an instruction using the DSS.

Since a branch delay instruction specifies an instruction input next to the branch instruction, the IID is necessarily [branch instruction IID]+1. The generation of a new entry is performed in a method similar to the method of the RSBR, but no control is performed to stop decoding as in the RSBR.

The branch instruction and the branch delay instruction can be input in any way so far as the instruction order is observed in the same strand regardless of the strand.

2) Relating to Erasing Entry of Branch Instruction Control Circuit

An entry of the branch instruction control circuit is released when the branch control of the branch instruction terminates. The branch control refers to the control of determining a branch, determining a branch target address, determining whether or not a branch prediction can be performed, requesting instruction re-fetch, and determining the address. Releasing an entry refers to a branch instruction being free of control of the branch instruction control circuit. In this case, the entry is cleared. Other conditions of clearing an entry can be an interrupting process, an instruction re-fetch request issued by a preceding instruction, etc.

Described below is the release of an entry when the branch control is terminated. In the branch instruction control circuit, the branch control of each entry is independently performed. In releasing an entry, the order of branch instructions has to be observed in the same strand in the branch instruction control circuit. However, the condition is not imposed among strands. In the present embodiment, the release of an entry can be performed at the maximum of two instructions simultaneously in the same strand. Although it is possible to simultaneously release the entries of a plurality of strands, it is not performed in the present embodiment because the amount of implementation wiring and the number of transistors largely increase.

The multi-thread runtime is described below with reference to FIG. 4. Since the branch instruction control circuit generates and manages an entry in the decoding order as described in 1) above, the instruction order is constantly guaranteed in the entries. Therefore, in the RSBRL, the entries are released from the RSBR 0, RSBR 1, and in the RSBRH, they are released from the RSBR 10, RSBR 11. Since the entries of different strands are not simultaneously released in the example in FIG. 4, it is necessary to determine from which group the entries are to be released. In this process, the priority is determined for each group of the RSBRs regardless of the allocation of a thread to any group.

Assume that the release condition of the RSBR 0 is satisfied in the RSBRL. If the release condition is satisfied, +RSBR0_COMPLETE_OR=1 is indicated. In this case, if the release condition of the RSBR 10 is not satisfied in the RSBRH, then the RSBRL group is constantly selected, and +RSBR10_COMPLETE_PRIORITY=0 (priority signal of 0) is indicated. This signal indicates which group the priority of the release of an entry is assigned. +RSBR10_COMPLETE_PRIORITY=0 indicates that the priority is assigned to the RSBRL, and +RSBR10_COMPLETE_PRIORITY=1 indicates that the priority is assigned to the RSBRH. In this case, +RSBR_COMPLETE_OR is a signal indicating that the release condition of the RSBR entry is satisfied. By inputting the priority signal to two select circuits, the RSBRL or the RSBRH from which an entry is to be released is selected. The entry of the RSBR 0 or the RSBR 10 is output as BR0_COMP from the select circuit 0, and the entry of the RSBR 1 or the RSBR 11 is output as BR1_COMP from the select circuit 1.

The release condition of an entry is not satisfied when the branch determination is not completed, the branch target address is not determined, a fetch request is not issued when an instruction re-fetch is required, a branch delay instruction for an entry is not issued, no entry is reserved, or no space is available in the branch target address buffer in the branch entry. When +RSBR0_COMPLETE_OR=1 and +RSBR10_COMPLETE_OR=1 are simultaneously satisfied, +RSBR10_COMPLETE_PRIORITY=0 is indicated unless an entry is released from the RSBRL in the preceding cycle, and the priority is passed to the RSBRL. In this case, +RSBR10_COMPLETE_PRIORITY=1 is necessarily indicated in the next cycle, and the priority is passed to the RSBRH. When the release condition is simultaneously satisfied in the RSBRL and the RSBRH, the priority transfers in the order of RSBRL, RSBRH, RSBRL, RSBRH, . . . . The RSBRH can acquire the priority when the release condition is not satisfied, or when an entry is released from the RSBRL in the preceding cycle. Otherwise, the priority is passed to the RSBRL.

If +RSBR0_COMPLETE_OR=1 and +RSBR10_COMPLETE_PRIORITY=1 are satisfied, an entry can be released. When the entry is released, the branch instruction order is to be observed in the same strand. Therefore, the RSBR 1 and the RSBR 0, and the RSBR 11 and the RSBR 10 can release an entry only simultaneously. When an entry is released, the branch instruction control circuit clears the entry. Clearing an entry is to set +RSBR_VALID from 1 to 0. For example, when the RSBR 0 and the RSBR 1 are simultaneously cleared, +RSBR0_VALID=1 is set to 0, and +RSBR1_VALID=1 is set to 0.

In the present embodiment, an entry is managed in the bubble-up system, and entries are bubbled up by the released entries. The bubble-up order is RSBR 6→RSBR 5→RSBR 4→RSBR 3→RSBR 2→RSBR 1→RSBR 0. The same holds also in the RSBRH. Therefore, there are entries in and after the RSBR 2, the VALID of the RSBR 0 and RSBR 0 can be kept as is. The entry data is rewritten in the bubble-up process. When an entry is released from the branch instruction control circuit, the information is transmitted to the instruction commit control circuit. A branch instruction released from the branch instruction control circuit is controlled by the instruction commit control circuit.

Figure 6:
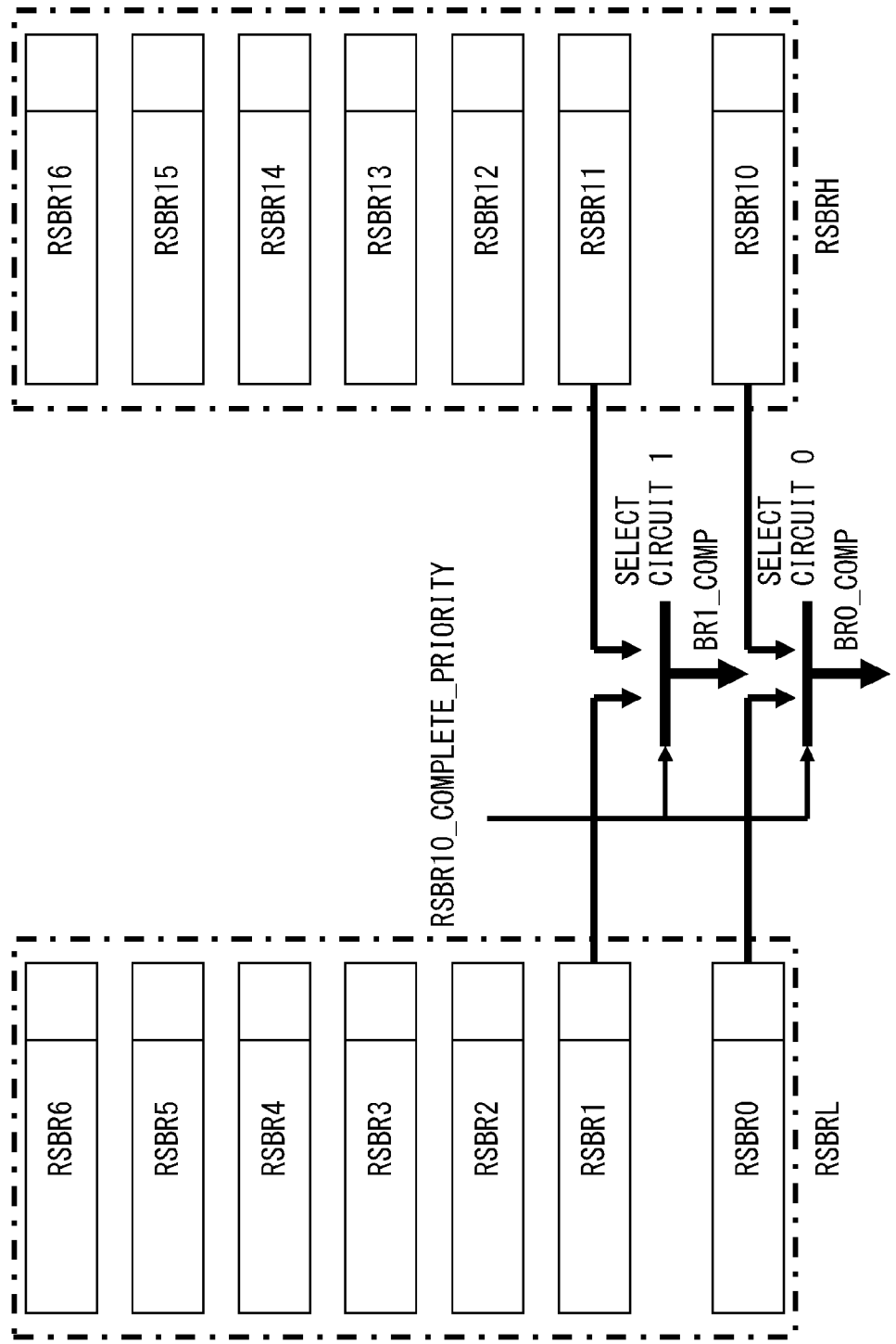
FIG. 6 is an explanatory view (4) of the operation of the branch reservation station according to an embodiment of the present invention.

The process performed in the single thread system is described below with reference to FIG. 6. When an entry is released, the branch instruction control circuit has to observe the branch instruction order in the same strand as described above. In the single thread system, no strand is selected, but as described in 1) above, entries can be found in both the RSBRL and RSBRH. In the same group, the instruction order is guaranteed, but it is necessary to determine which is a leading instruction group, the RSBRL or the RSBRH. To make the determination, the above-mentioned +RSBR10_COMPLETE_PRIORITY (priority signal) is used. By inputting the priority signal to two select circuits, the RSBRL or the RSBRH from which an entry is to be released is selected. The entry of the RSBR 0 or the RSBR 10 is output as BR0_COMP from the select circuit 0, and the entry of the RSBR 1 or the RSBR 11 is output as BR1_COMP from the select circuit 1.

When the RSBRL includes an entry and the RSBRH includes no entry, +RSBR10_COMPLETE_PRIORITY=0 is indicated. On the other hand, when the RSBRH includes an entry and the RSBRL includes no entry, +RSBR10_COMPLETE_PRIORITY=1 is indicated. When there are entries in both RSBRL and RSBRH, a leading instruction group is specified. For example, assume that there are entries in both RSBRL and RSBRH, and the RSBRL is a leading instruction group. Since the RSBRL is a leading instruction group, +RSBR10_COMPLETE_PRIORITY=0 is indicated. When the last entry in the RSBRL is released, +RSBR10_COMPLETE_PRIORITY=1 is indicated. Afterwards, the processes are repeated, and the priority is transferred in the order of RSBRL, RSBRH RSBRL RSBRH, .... The transfer of the priority is performed when there is no entry in the other group. Other operations are the same between the single thread system and the multi-thread system.

As a signal indicating the priority for a release, one signal +RSBR10_COMPLETE_PRIORITY is described in the embodiment above. However, when three or more threads are simultaneously executed in the instruction control device, the number of signals can be increased depending on the number of threads using this signal. To be more practical, since +RSBR10_COMPLETE_PRIORITY is designed as a concept of a pointer in the present embodiment, two threads require only one bit. When the number of threads is three or four, one additional bit, that is, a total of two bits are used. The threads are expressed in a [1:0] form, and 00 indicates thread 0, 01 indicates thread 1, 10 indicates thread 2, and 11 indicates thread 3.

3) Relating to Management of Branch Target Address

A branch instruction can be classified into two types in the method of calculating a branch target address. That is, an instruction relative branch calculates the addresses of the instructions specified by an operation code from a branch instruction address to obtain branch target addresses, and a register relative branch calculates a branch target address by referring to a register specified by an operation code. In the present embodiment, a branch target address is calculated by an instruction relative branch address generation circuit for the instruction relative branch, and by an arithmetic unit for the register relative branch. The instruction relative branch calculates an address in the decoding cycle, and when a branch instruction is input from the decoder, the branch prediction address is passed to the branch instruction control circuit. In this case, when a branch prediction is performed, the branch prediction address is compared with the calculated branch target address, and the result is transmitted to the branch instruction control circuit. The register relative branch performs a calculation in an arithmetic cycle after the decoding, and the branch target address is passed to the branch instruction control circuit. When a branch prediction is performed, the branch prediction address is compared with the calculated branch target address by the branch instruction control circuit. While the branch instruction is controlled by the branch instruction control circuit, the branch target address is managed as entry data for each entry.

When the entry is released after the completion of the control of the branch instruction, the branch target address is passed to the branch target address buffer. The passed address is only the branch target address of the instruction that causes a branch after the branch determination.

Figure 9:
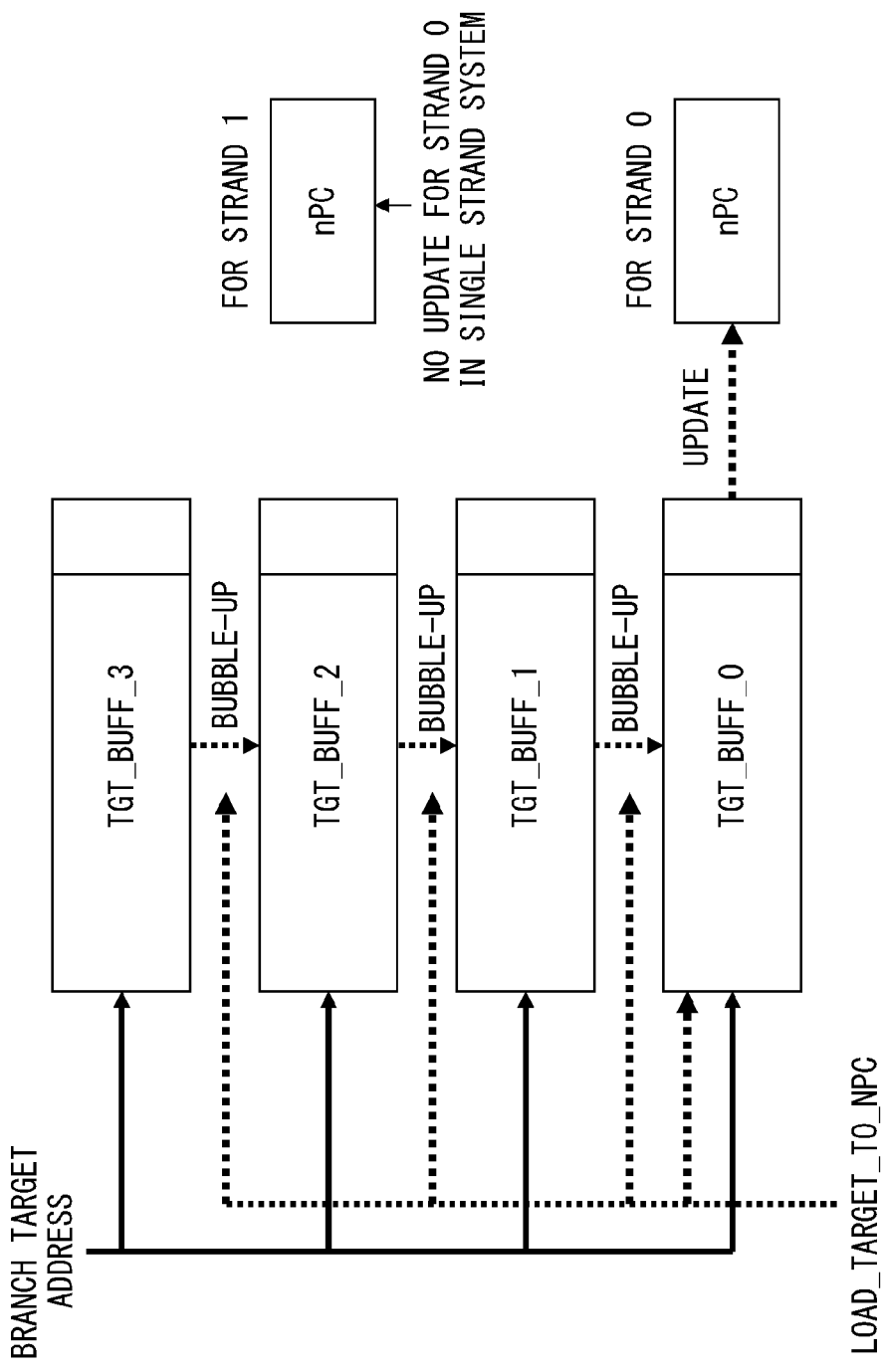
FIG. 9 is an explanatory view (2) of the operation of a branch target address buffer.

FIGS. 8 and 9 are explanatory views of the operations of the branch target address buffer.

In the present embodiment, the data passed to the branch target address is the data of only one instruction to reduce the amount of implementation wiring and the number of transistors. In addition to the branch target address, +COMPLETE_RSBR_IID[5:0] and +COMPLETE_RSBR_STRAND_ID are passed to the branch target address buffer. +COMPLETE_RSBR_IID is a signal indicating an instruction ID of the address passed to the branch target address buffer. +COMPLETE_RSBR_STRAND_ID is a signal indicating the strand ID of the address passed to the branch target address buffer.

After the branch instruction is released from the branch instruction control circuit, the branch target address buffer manages the branch target address after the instruction is committed (completion of instruction) until the PC (program counter) and the nPC (next program counter) are updated. When the branch instruction is committed, the instruction commit control circuit transmits +LOAD_TARGET_TO_NPC and +COMMIT_STRAND_ID. The branch target address buffer updates the nPC and clears an entry according to the information. The condition of clearing an entry can also be an interrupt process by a leading instruction. In the present embodiment, the nPC is updated by a branch instruction for only one instruction in one strand in one cycle. +LOAD_TARGET_TO_NPC is a signal indicating that the branch instruction is committed and the nPC is updated from the branch target address buffer. +COMMIT_STRAND_ID indicates the strand ID of the committed instruction.

When the branch target address buffer becomes full, +RSBR_TGT_BUFF_BUSY=1 is indicated, and a branch instruction from the branch instruction control circuit is not released. No branch instruction is released. However, as described above, the release of an entry is performed by the branch instruction control circuit on the condition of the branch instruction order in the same strand. Therefore, the releasing process can be temporarily stopped. The branch target address buffer becomes full by the delay of the committing process of the leading instruction to the branch instruction. +RSBR_TGT_BUFF_BUSY is a signal indicating that there is no available entry in the branch target address buffer.

The branch target address buffer is configured by a total of four entries, that is, TGT_BUFF_0, TGT_BUFF_1, TGT_BUFF_2, and TGT_BUFF_3. Like the RSBR etc., the branch target address buffer has entries divided into two groups (TGT_BUFF_0, 1 and TGT_BUFF_2, 3) in the bubble-up system.

In the multi-strand system (FIG. 8), the branch target address of the strand 0 is allocated to the TGT_BUFF_0, 1, and the address of the strand 1 is allocated to the TGT_BUFF_2, 3, and the bubble-up is performed in the order of TGT_BUFF_1→TGT_BUFF_3→TGT_BUFF_2. The next program counter (nPC) is provided for each strand. When a signal +LOAD_TARGET_TO_NPC is input, the address of TGT_BUFF_0 is used to update the nPC for the strand 0, and the address of TGT_BUFF_2 is used to update the nPC for the strand 1.

In the single strand system (FIG. 9), the branch target address is allocated to TGT_BUFF_0, 1, 2, 3, and the bubble-up is performed in the order of TGT_BUFF_3→TGT_BUFF_2→TGT_BUFF_1→TGT_BUFF_0. The next program counter (nPC) is provided for each strand, but in the single strand system, the nPC for the strand 1 is not used. When the signal +LOAD_TARGET_TO_NPC is input, the address of TGT_BUFF_0 is used to update the nPC for the strand 0.

Described above is the entry control method in the multi-thread system and the single thread system. In addition, the number of entries used when an event occurs can be restricted.

Practically, the number of entries of RSBR, DSS, TGT_BUFF can be restricted. The RSBR, DSS can change the condition of the full status of the entry in which +PLID_RSBR is set to 1, and TGT_BUFF can change the condition of the full status of the entry in which +RSBR_TGT_BUFF_BUSY is set to 1. Normally, it is assumed that all entries are used to guarantee the performance of the instruction processing apparatus. However, under a specific condition, they can be used when the number of entries to be used is reduced in any event, for example, when the performance is to be reduced, when the power consumption is to be reduced, etc.

FIGS. 10 through 13 are explanatory views of controlling the number of entries to be used of the RSBR.

Figure 10:
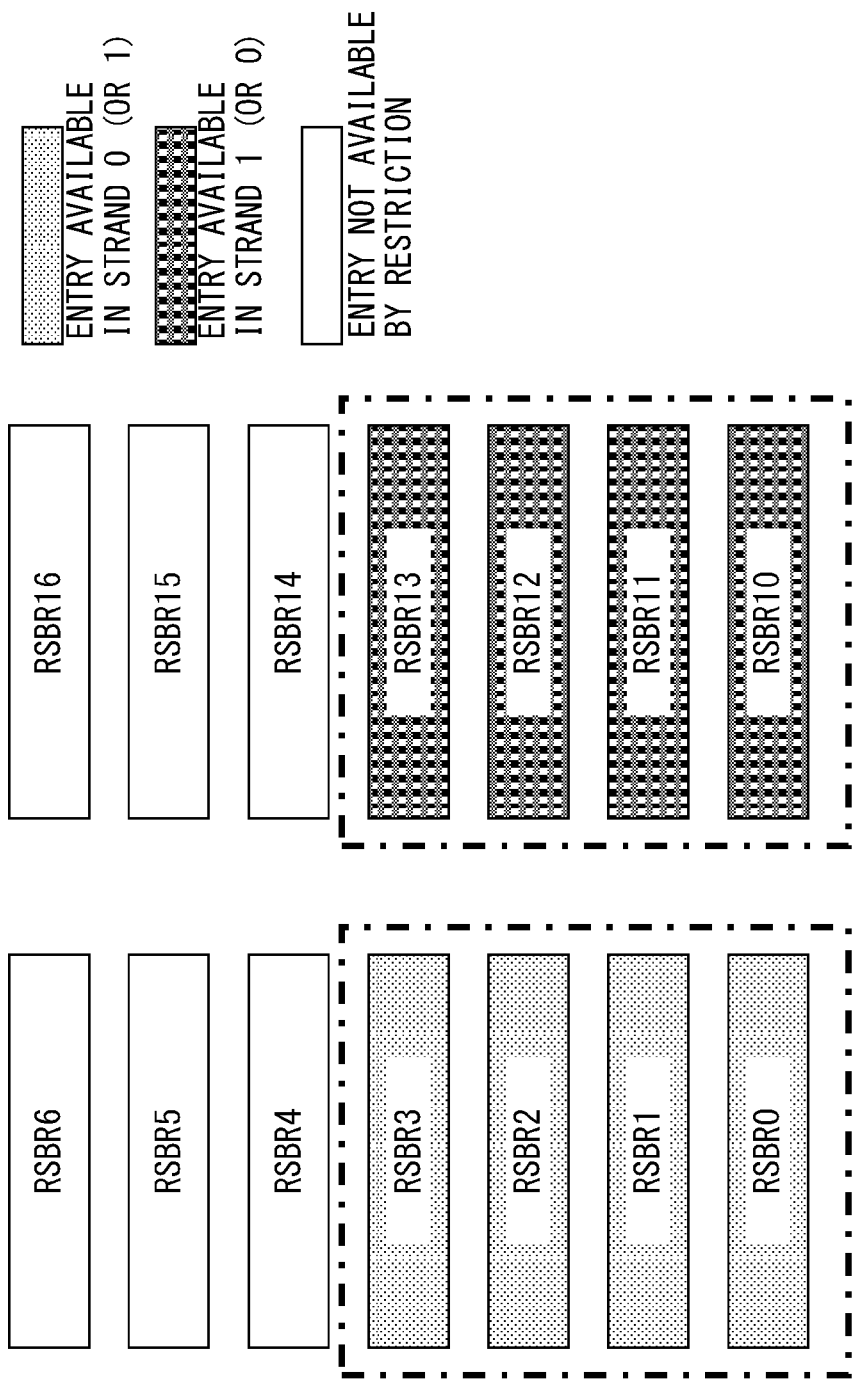
FIG. 10 is an explanatory view (1) of controlling the number of entries being used in a RSBR.
Figure 11:
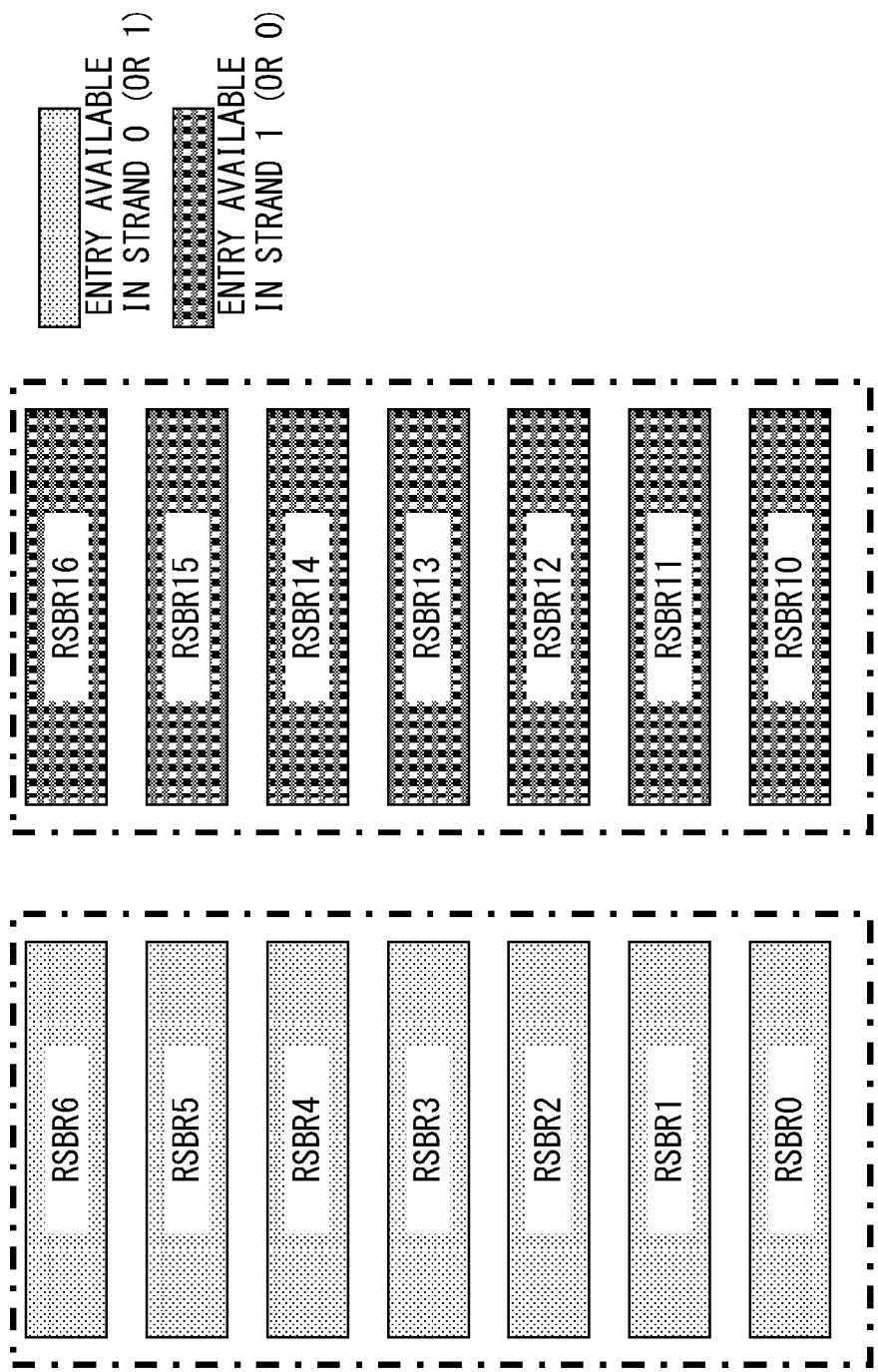
FIG. 11 is an explanatory view (2) of controlling the number of entries being used in a RSBR.
Figure 12:
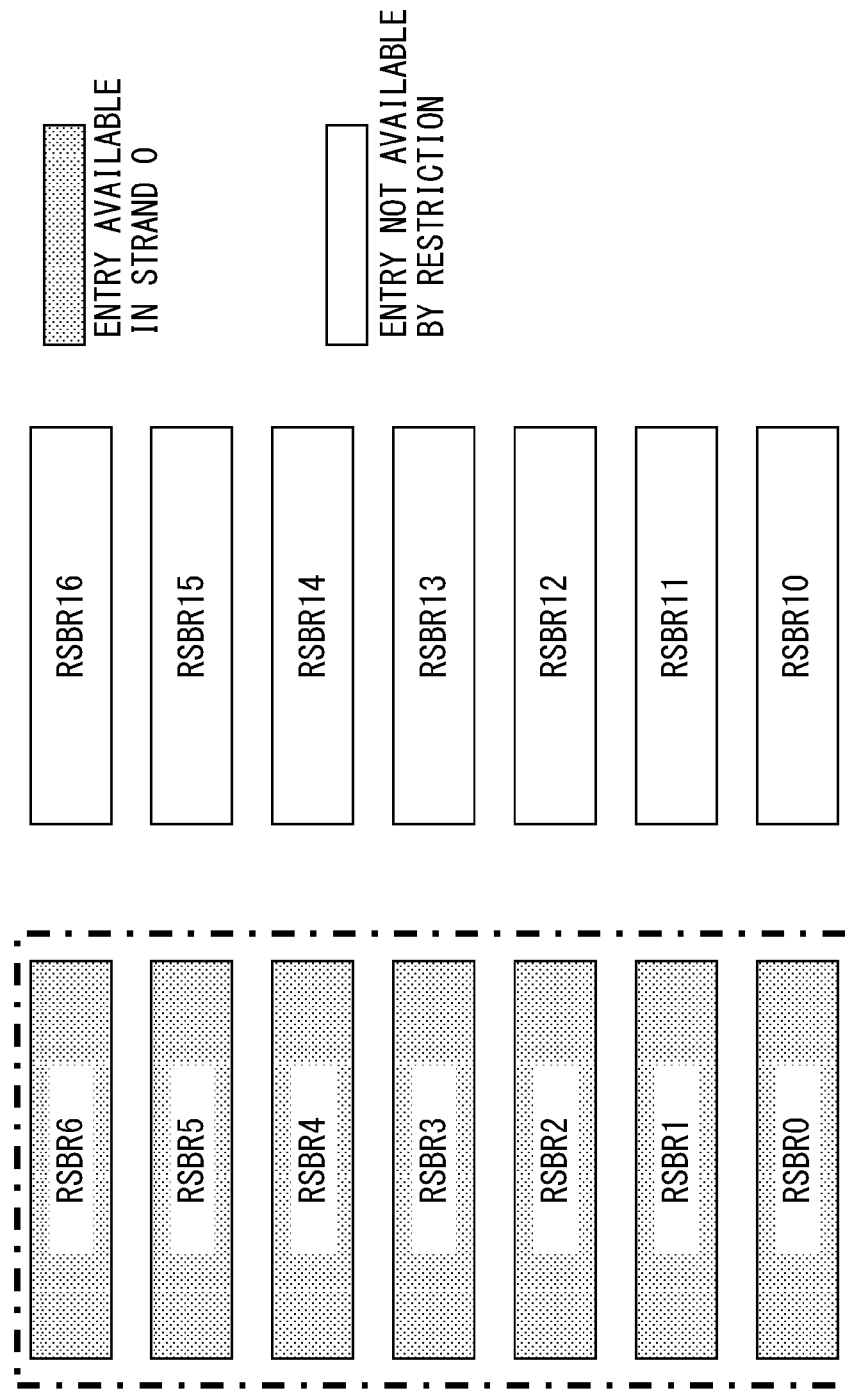
FIG. 12 is an explanatory view (3) of controlling the number of entries being used in a RSBR.
Figure 13:
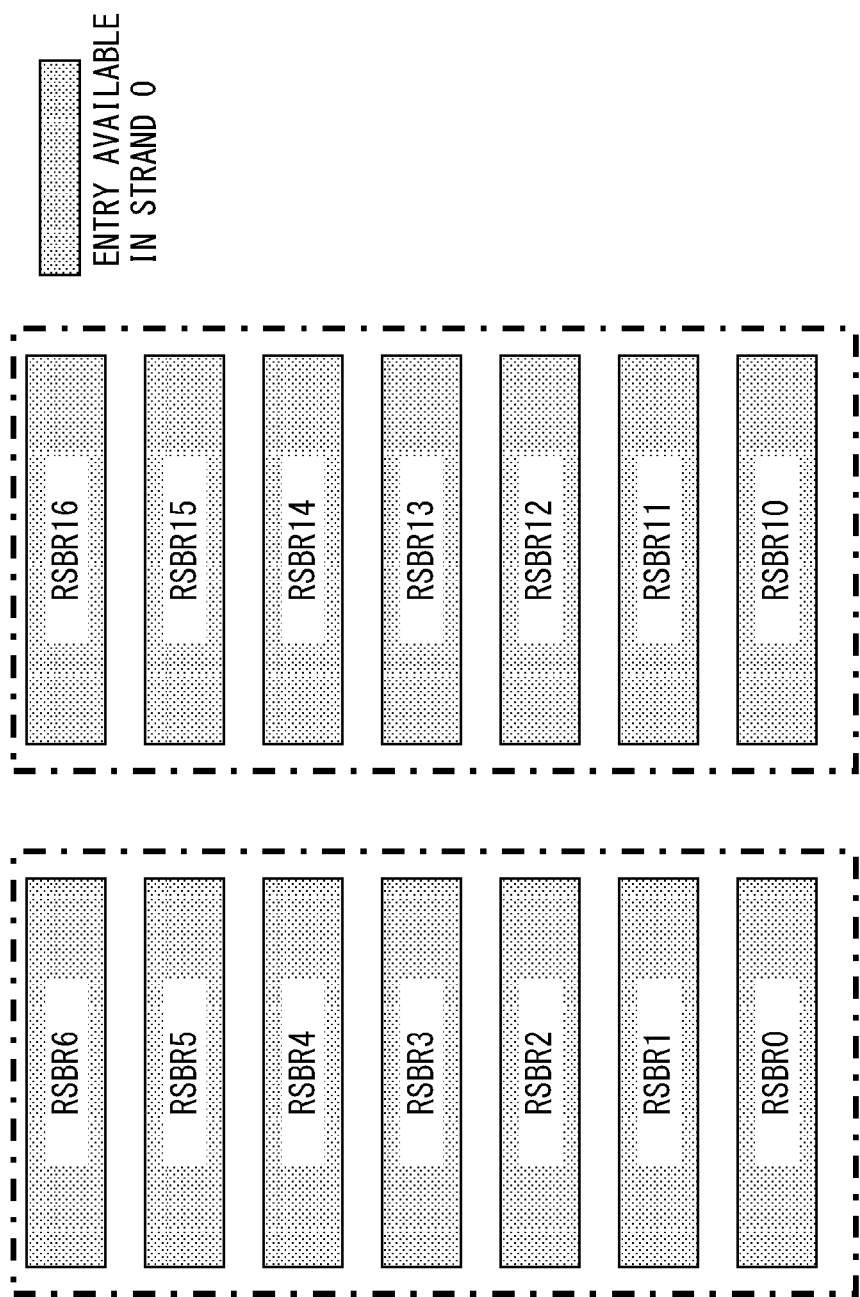
FIG. 13 is an explanatory view (4) of controlling the number of entries being used in a RSBR.

In FIG. 10, two strands are used and the number of entries to be used of the RSBR is restricted to four. The RSBR 0 through RSBR 3 are used by the strand 0 (1), and the RSBR 10 through RSBR 13 are used by the strand 1 (0). The RSBR 4 through RSBR 6 and the RSBR 14 through RSBR 16 are unused entries. FIG. 11 illustrates the case in which all entries of the RSBR are used. The RSBR 0 through RSBR 6 are used by the strand 0 (1), and the RSBR 10 through RSBR 16 are used by the strand 1 (0). FIG. 12 illustrates the case in which the number of entries in the RSBRs to be used is seven in one strand. The RSBR 0 through RSBR 6 are used, but the RSBR 10 through RSBR 16 are not used. FIG. 13 illustrates the case in which the number of entries in the RSBRs to be used is not restricted in one strand. All of the fourteen entries are used.

Figure 14:
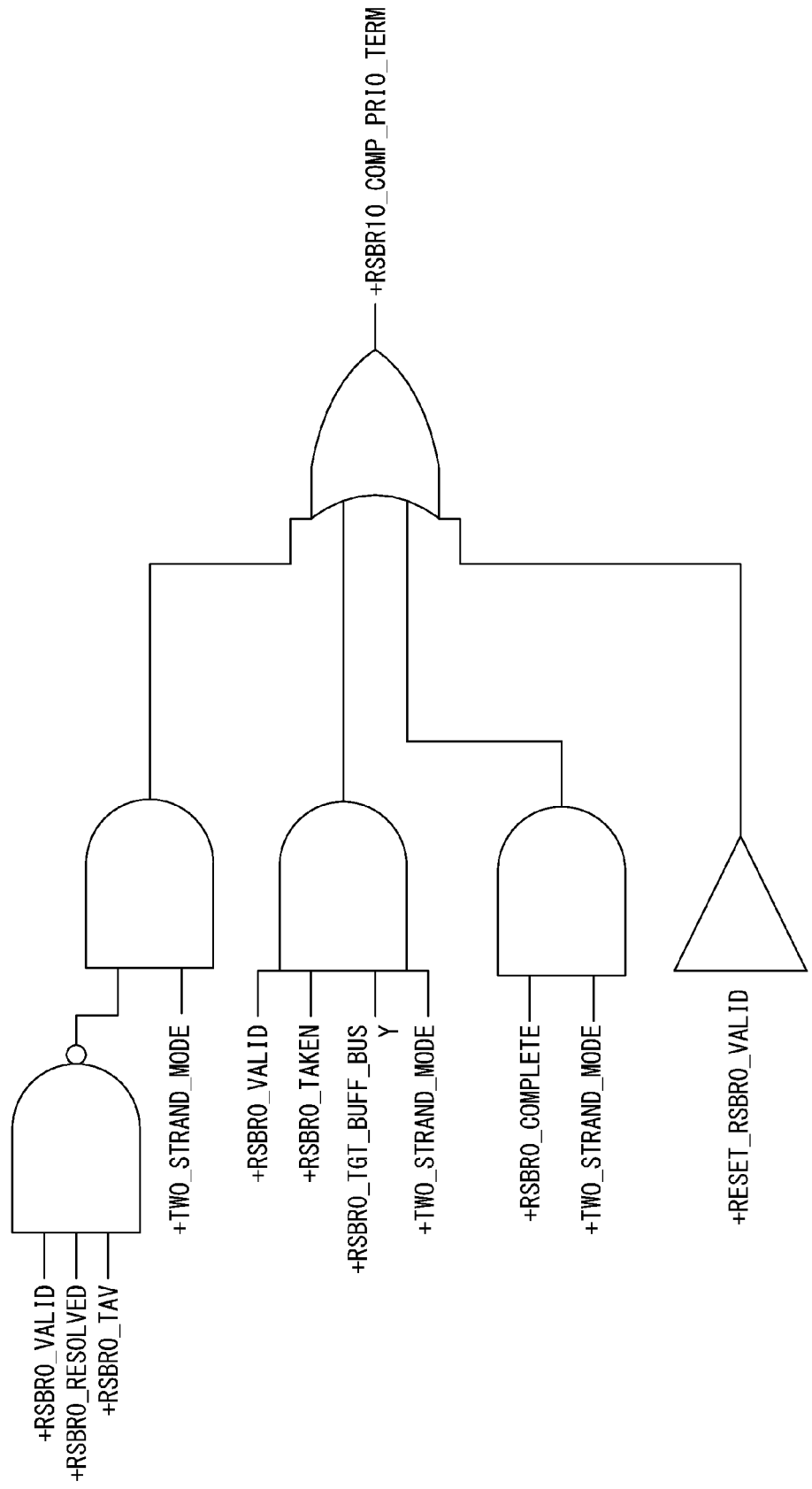
FIG. 14 is a view (1) of the gate of a circuit for generating a priority signal.
Figure 15:
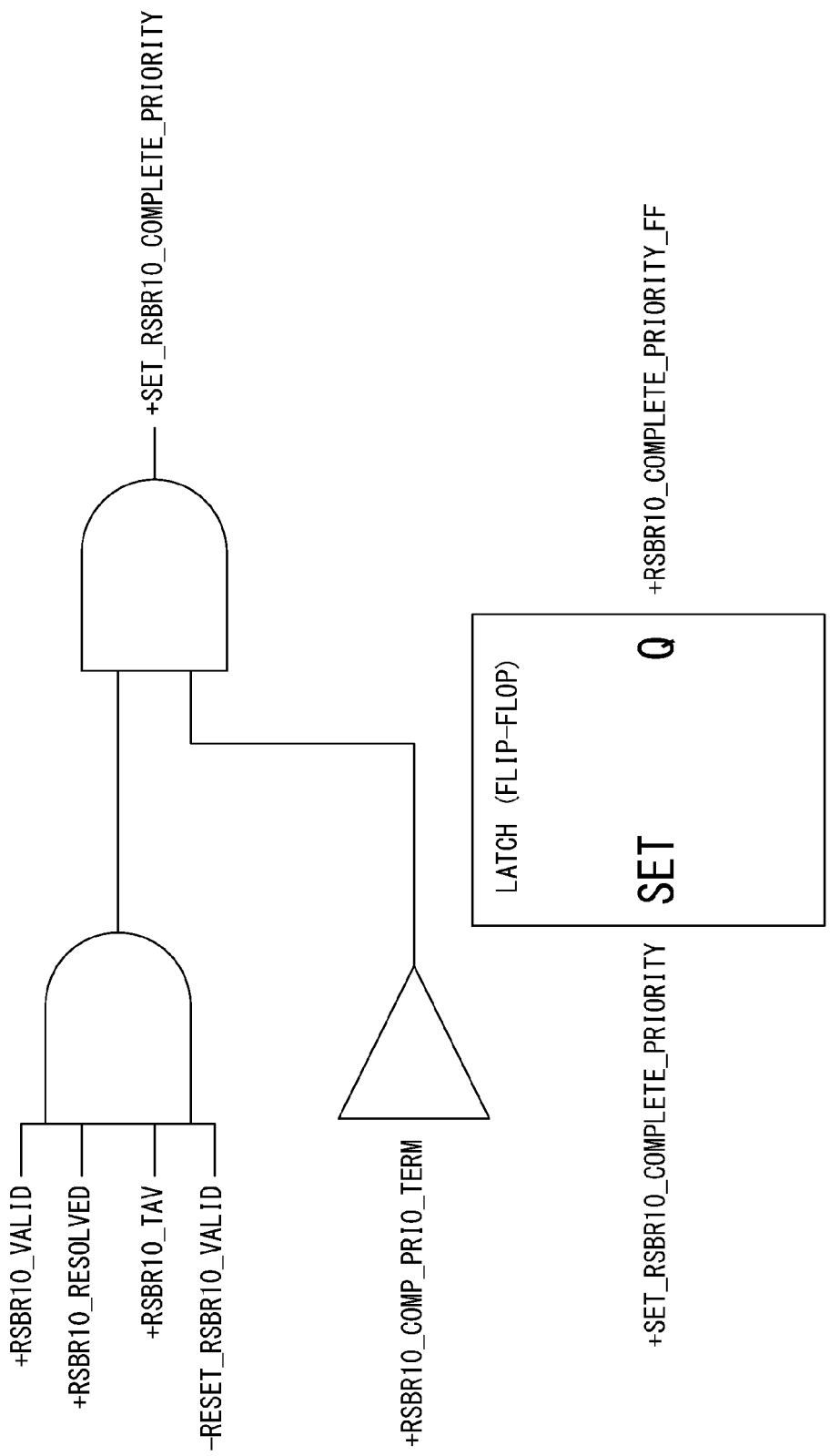
FIG. 15 is a view (2) of the gate of a circuit for generating a priority signal.
Figure 16:
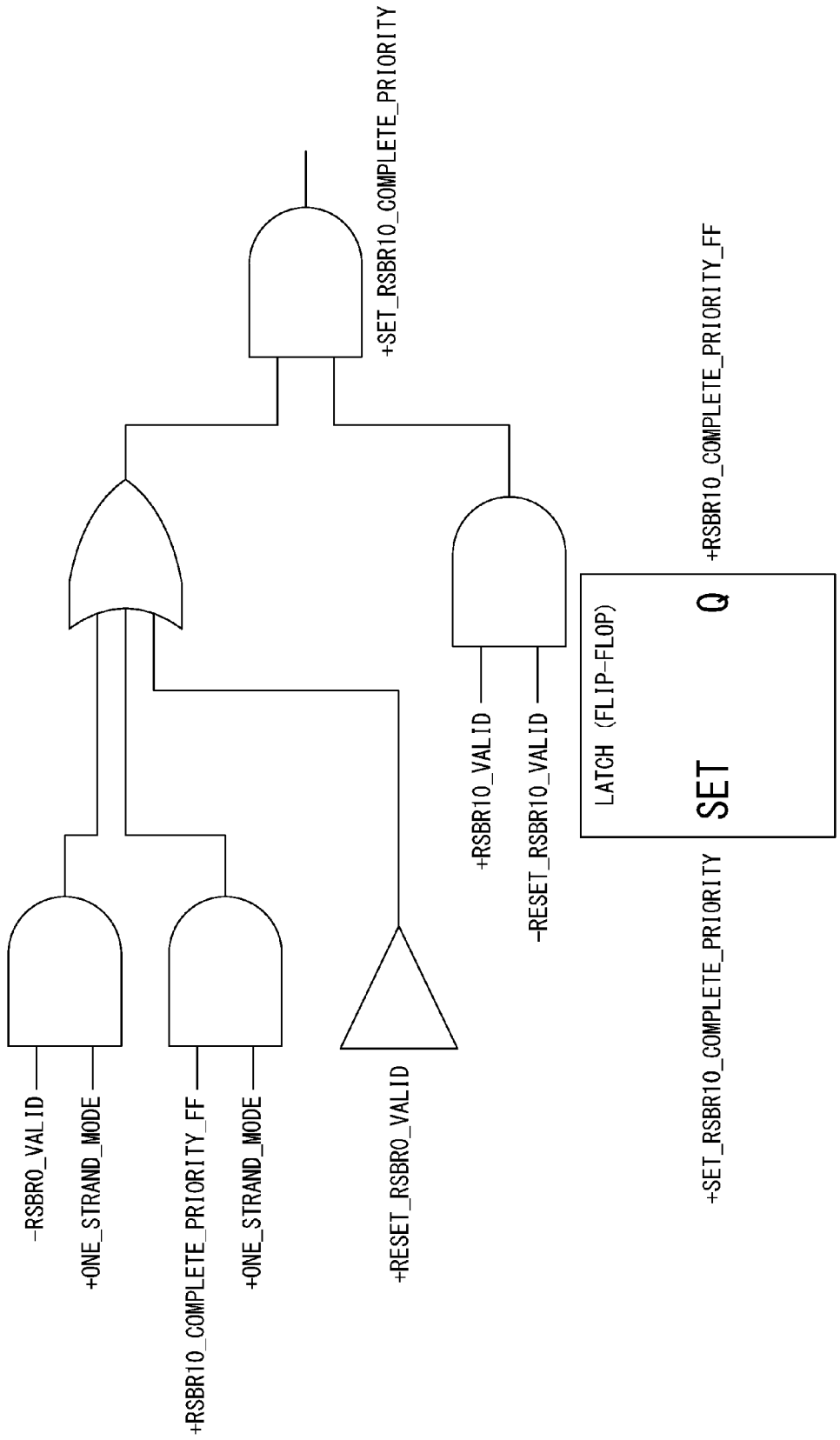
FIG. 16 is a view (3) of the gate of a circuit for generating a priority signal.

FIGS. 14 through 16 illustrate the gate of a circuit for generating a priority signal.

These circuits are provided in the branch instruction control circuit 11. The circuit for two strands (FIGS. 14 and 15) and the circuit for one strand (FIG. 16) are provided in parallel, and one of them operates depending on the number of strands.

FIGS. 14 and 15 illustrate the case in which two strands are used. FIG. 16 illustrates the case in which one strand is used.

Described below are the signal names illustrated in FIGS. 14 through 16.

+RSBR0_VALID: indicating that entries of the RSBR 0 are valid.

+RSBR0_RESOLVED: indicating that the branch determination of the RSBR 0 is established.

+RSBR0_TAV: indicating that the branch target address of the RSBR 0 is determined.

+TWO_STRAND_MODE: indicating that the execution pipeline executes two threads at the instruction signal from the process machine check circuit.

+RSBR0_TAKEN: indicating that the branch determination of the RSBR 0 is made and the branch is performed.

+RSBR_TGT_BUFF_BUSY: indicating that there is no available entry in the branch target address buffer used by the RSBR 0.

+RSBR0_COMPLETE: indicating that the release of an entry of the RSBR 0 occurs.

+RESET_RSBR0_VALID: indicating that it is necessary to reset the entries of the RSBR 0. The reset conditions are clearing an execution pipeline (specified by the process machine check circuit) and releasing entries. Similar processes are performed with respect to the signals of the RSBR 10.

The numerals following the RSBR indicate the number of the entry of the RSBR. Therefore, +RSBR0_VALID relates to the RSBR 0, but +RSBR10_VALID relates to the RSBR 10.

In FIG. 14,

Two strands are being executed, and the release condition of the branch instruction of the RSBR 0 entry is not satisfied.

Two strands are being executed and a branch instruction is issued with respect to the RSBR 0 entry, and there is no available entry in the branch target address buffer for the RSBR 0 (RSBRL group). Thus, entries cannot be released.

Two strands are being executed, and the branch instruction of the RSBR 0 is released. On the condition, if the release condition is satisfied for the strands 0 and 1, 0 and 1 can be alternately released.

A reset request for the RSBR 0 entry is received.

If any of the above listed conditions is satisfied, +SET_RSBR10_COMPLETE_PRIORITY=1 is indicated.

In FIG. 15,

Two strands are being executed, and the release conditions of the branch instruction of the RSBR 10 entry are satisfied.

+RSBR10_COMP_PRIO_TERM=1 is indicated.

When all conditions are satisfied, +SET_RSBR10_COMPLETE_PRIORITY=1 is indicated.

The signal is a set signal of the above-mentioned +RSBR10_COMPLETE_PRIORITY (priority signal). The signal +RSBR10_COMPLETE_PRIORITY for selection of the strand of the RSBR is obtained by latching (flip-flop) the value of +SET_RSBR10_COMPLETE_PRIORITY and output the resultant value.

FIG. 16 illustrates the circuit in which one strand is used. The meanings of the signals illustrated in FIG. 16 and not listed above are described as follows.

+ONE_STRAND_MODE: indicating that the execution pipeline performs execution in the single thread system at the instruction signal from the process machine check circuit.

In FIG. 16,

In the single thread execution, the RSBR 0 includes no entry.

In the single thread execution, +RSBR10_COMPLETE_PRIORITY already indicates 1.

A reset request for RSBR 0 entry is received.

When any of the above listed conditions is satisfied, and the RSBR 10 includes an entry, +SET_RSBR10_COMPLETE_PRIORITY=1 above is indicated.

The signal is a set signal of +RSBR10_COMPLETE_PRIORITY (priority signal).

+RSBR10_COMPLETE_PRIORITY is obtained by latching (flip-flop) the value of +SET_RSBR10_COMPLETE_PRIORITY, and outputting the resultant value.

Figure 17:
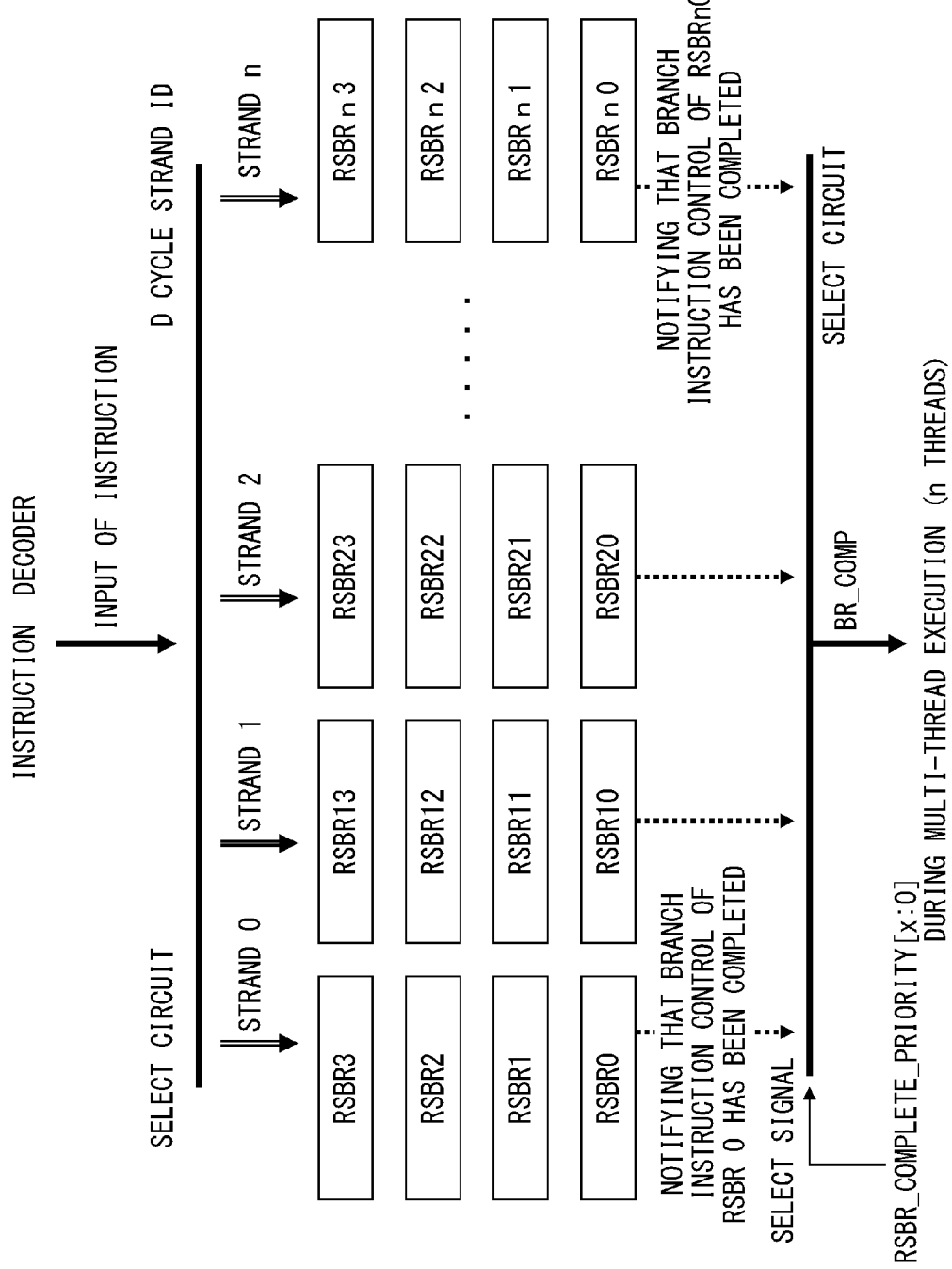
FIG. 17 is a view of an example of the configuration of the RSBR having n strands.

FIG. 17 is an example of a configuration of the RSBR when n strands are used.

RSBR10_COMPLETE_PRIORITY[x:0] is a pointer indicating a branch instruction of which strand is to be released on a priority basis. x is determined by $2^{\wedge}(x+1) \geq n$. When a branch instruction is released from a reservation station, the branch instruction control is completed, and the instruction is selected and released from the strand specified by a pointer on a priority basis. When the instruction is input from the instruction decoder, the strand ID is provided for the select circuit in the D cycle, and the instruction is stored in the entry of the strand corresponding to the strand ID. When the instruction commit control circuit transmits a notification that the branch instruction control has been completed on any of the RSBR 0 through RSBR n0, the entry of the strand released by the select circuit is selected according to RSBR10_COMPLETE_PRIORITY[x:0] (select signal), and the released entry is output as BR_COMP. In FIG. 17, the number of threads is n.

On the execution pipeline, a strand to be executed on a priority basis is specified by the process machine check circuit. Single thread execution or 2-thread pixel (multi-thread execution) is specified, and the strand 0 or the strand 1 in the single thread execution is specified. The process machine check circuit determines the multi-thread execution or the single thread execution. The control is possibly performed at an instruction from an execution program, or when it is difficult to perform the multi-thread execution due to a hardware fault etc. The factor of the determination of the single thread execution or the multi-thread execution can be any other than those listed above. When a switch between the single thread execution and the multi-thread execution is performed, the instruction on the execution pipeline is temporarily cleared, and re-execution is performed from instruction fetch.

In the descriptions above, when a change is made to the number of threads (number of strands), it is detected by the process machine check circuit to dynamically correspond to the change of the number of threads by setting the number of strands in the branch reservation station, the delay instruction stack, and the branch target address buffer.

As described above, when a plurality of threads are simultaneously executed, the entries of the branch reservation station, the delay instruction stack, and the branch target address buffer are grouped into the number of threads so that the entries can be independently used by each thread. When a single thread system is used, these entries are used by a single thread without grouping the entries. By appropriately grouping and using the entries by switching between the single thread system and the plural thread system, the number of entries unused and wasted can be reduced, thereby effectively using the hardware resources of the information processing apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A processor in which a single thread can be executed or a plurality of threads can be simultaneously executed, the processor comprising:
a number-of-threads detection unit to detect a number of threads being executed;
a branch reservation station unit, including separated entry sets corresponding to a plurality of entry groups, to group entries into the number of threads depending on the number of threads being executed, to correspond each entry group to each thread, to perform processing a branch delay instruction stored in an entry in an out-of-order execution system independently for each thread, to select an entry group so that a release of an entry is performed in an in-order execution system in each thread, and to release an entry; and
a selection unit to select one of the separated entry sets each storing one of the plurality of the entry groups.

2. The processor according to claim 1, wherein
the branch reservation station unit disables a part of entries to be used.

3. The processor according to claim 1, wherein
the entries of the branch reservation station unit are grouped dynamically depending on a change of the number of threads.

4. A processor in which a single thread can be executed or a plurality of threads can be simultaneously executed, the processor comprising:
a number-of-threads detection unit to detect a number of threads being executed;
a delay instruction stack unit, including separated entry sets corresponding to a plurality of entry groups, to group entries into the number of threads depending on the number of threads being executed, to correspond each entry group to each thread, to perform processing a branch instruction stored in an entry in an out-of-order execution system independently for each thread, to select an entry group so that a release of an entry is performed in an in-order execution system in each thread, and to release an entry; and
a selection unit to select one of the separated entry sets each storing one of the plurality of the entry groups.

5. The processor according to claim 4, wherein
the delay instruction stack unit disables a part of entries to be used.

6. The processor according to claim 4, wherein
the entries of the delay instruction stack unit are grouped dynamically depending on a change of the number of threads.

7. A processor in which a single thread can be executed or a plurality of threads can be simultaneously executed, the processor comprising:
a number-of-threads detection unit to detect a number of threads being executed;
a branch target address buffer unit, including separated entry sets corresponding to a plurality of entry groups, to group entries into a number of threads depending on the number of threads being executed, to correspond each entry group to each thread, to store a branch target address independently for each thread, to select an entry group, and to release an entry; and
a selection unit to select one of the separated entry sets each storing one of the plurality of the entry groups.

8. The processor according to claim 7, wherein
the branch target address buffer unit disables a part of entries to be used.

9. The processor according to claim 7, wherein
the entries of the branch target address buffer unit are grouped dynamically depending on a change of the number of threads.

10. A method conducted by a processor in which a single thread can be executed or a plurality of threads can be simultaneously executed, the method comprising:
   detecting a number of threads being executed;
   providing separated entry sets corresponding to a plurality of entry groups;
   grouping entries into the number of threads depending on the number of threads being executed;
   corresponding each entry group to each thread;
   performing processing a branch delay instruction stored in an entry in an out-of-order execution system independently for each thread;
   selecting an entry group so that a release of an entry is performed in an in-order execution system in each thread;
   releasing an entry; and
   selecting one of the separated entry sets each storing one of the plurality of the entry groups.

11. A method conducted by a processor in which a single thread can be executed or a plurality of threads can be simultaneously executed, the method comprising:
   detecting a number of threads being executed;
   providing separated entry sets corresponding to a plurality of entry groups;
   grouping entries into the number of threads depending on the number of threads being executed;
   corresponding each entry group to each thread;
   performing processing a branch instruction stored in an entry in an out-of-order execution system independently for each thread;
   selecting an entry group so that a release of an entry is performed in an in-order execution system in each thread;
   releasing an entry; and
   selecting one of the separated entry sets each storing one of the plurality of the entry groups.

12. A method conducted by a processor in which a single thread can be executed or a plurality of threads can be simultaneously executed, the method comprising:
   detecting a number of threads being executed;
   providing separated entry sets corresponding to a plurality of entry groups;
   grouping entries into a number of threads depending on the number of threads being executed;
   corresponding each entry group to each thread;
   storing a branch target address independently for each thread;
   selecting an entry group;
   releasing an entry; and
   selecting one of the separated entry sets each storing one of the plurality of the entry groups.

* * * * *